Figure 1:
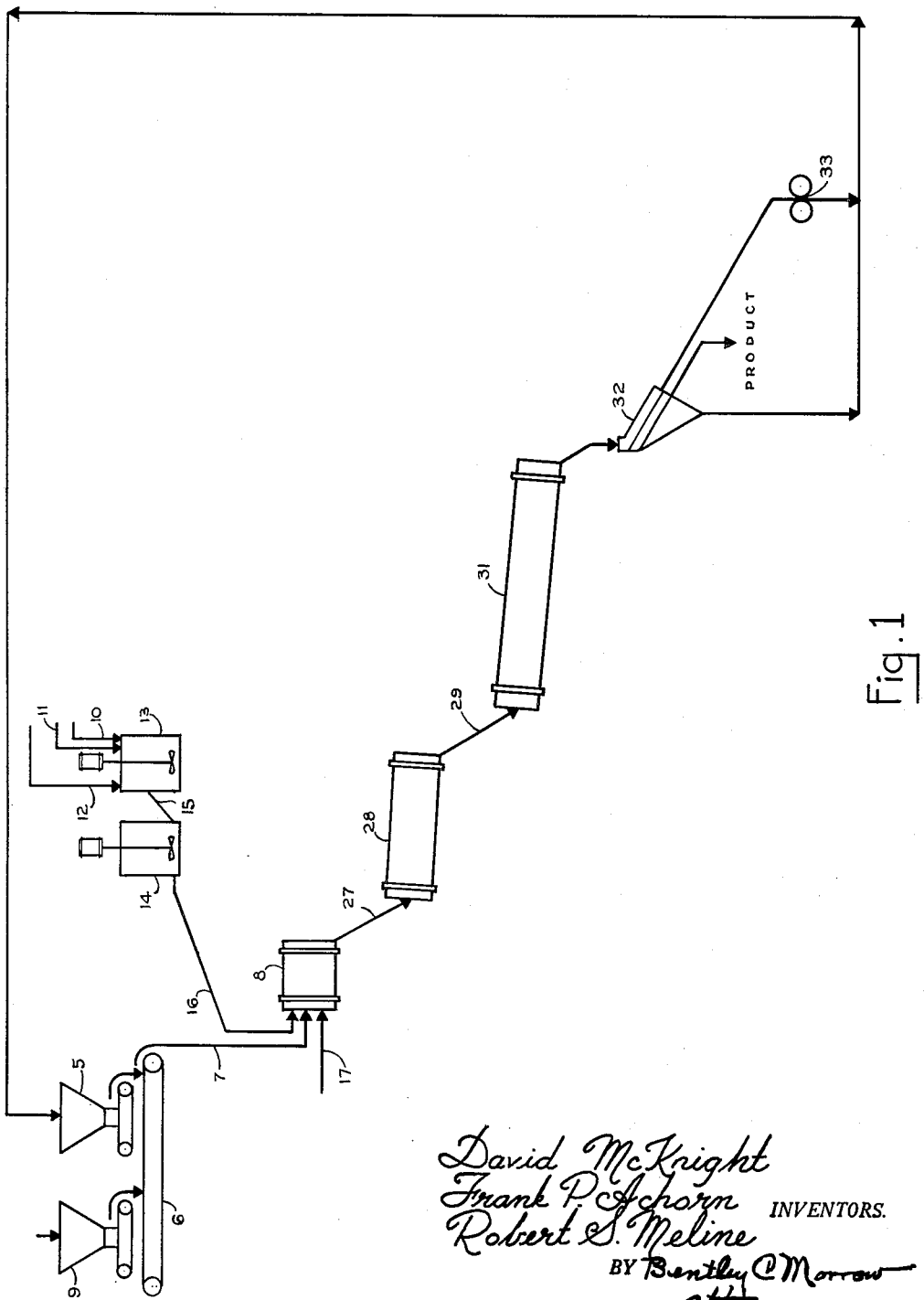

Oct. 24, 1961 D. McKNIGHT ET AL 3,005,697
NITRIC PHOSPHATE PROCESS
Filed April 9, 1958 2 Sheets-Sheet 1

David McKnight
Frank P. Achorn   INVENTORS.
Robert S. Meline
BY Bentley C. Morrow
Attorney Oct. 24, 1961   D. McKNIGHT ET AL   3,005,697
NITRIC PHOSPHATE PROCESS
Filed April 9, 1958   2 Sheets-Sheet 2

David McKnight
Frank P. Achorn   INVENTORS.
Robert S. Meline
BY Bentley C. Morrow
attorney

United States Patent Office 3,005,697  
Patented Oct. 24, 1961

3,005,697  
NITRIC PHOSPHATE PROCESS  
David McKnight, Florence, Ala., Frank P. Achorn, Pascagoula, Miss., and Robert S. Meline, Florence, Ala., assignors to Tennessee Valley Authority, a corporation of the United States  
Filed Apr. 9, 1958, Ser. No. 727,502  
2 Claims. (Cl. 71—64)  
(Granted under Title 35, U.S. Code (1952), sec. 266)

The invention herein described may be manufactured and used by or for the Government for governmental purposes without the payment to us of any royalty therefor.

This invention is an improved process for the manufacture of nitric phosphate fertilizers. Fertilizers of this type are made by treating phosphate rock with nitric acid to form a slurry. The slurry then is mixed with potash salts and trace elements, if desired, is neutralized with ammonia, is granulated and dried. Processes of this type have been used for many years in Europe, and it is believed that three plants have been built and operated in this manner in the United States.

Nitric phosphates have a great inherent advantage in raw-material costs over many other processes for producing similar grades of fertilizer. Raw-material costs for nitric phosphate fertilizers may be 20 to 30 percent less than for fertilizers of the same grade made by other processes. Nevertheless, nitric phosphate processes have not been widely used in this country. They have had several disadvantages which offset the advantages to be gained by lower raw-material costs.

It has been necessary to use relatively dilute nitric acid in treating phosphate rock to form slurries in this process. When a slurry contained less than about 30 percent water it gelled during ammoniation and become unmanageable. Even with sufficient water content to prevent gelling of the mass, such slurries have been prone to localized overammoniation accompanied by irreversible reversion of phosphate to a form unavailable for plant food.

The large quantity of water necessary to ensure fluidity of the slurries ultimately had to be evaporated, and this required fuel. As such slurries dried from fluid to solid stage, they necessarily went through a transition or mud stage. In this mud stage the material was difficult to dry without localized overheating and the resulting heavy loss of nitrogen.

Although such difficulties were inherent in nitric phosphate processes, it was known that they could be largely overcome by the use of proper equipment and operational procedures. The equipment required was much more expensive than that required for other processes; entirely new plants were necessary, since little conventional fertilizer equipment could be used; the apparatus necessary for nitric phosphate processes was not adaptable for use in other processes for the production of fertilizers; and the nitric phosphate process itself was not adaptable to the manufacture of as large a variety of fertilizer grades as most manufacturers require to supply their markets.

It is an object of this invention to provide a process for the manufacture of nitric phosphate fertilizers which may be carried out in cheap equipment readily available in many fertilizer plants.

Another object is to provide such process which is versatile and can be used for the manufacture of a large variety of fertilizer grades.

Still another object is to provide such process in which ammoniation may be carried out easily to a very high degree without undue reversion of phosphate to a form unavailable for plant food.

Another object is to provide such process in which difficulties due to a mud stage at a transition point between fluid and solid stages are eliminated.

Another object is to provide such process in which very little loss of nitrogen during drying is inherent.

Yet another object is to provide such process in which fuel requirements are greatly reduced.

Other objects and advantages of our invention will become apparent as this disclosure proceeds.

We have found that these objects are attained in a process which comprises introducing a substantial portion of fines recycled from a later sizing step, together with some superphosphate if required to balance a formulation, into a rotating drum; maintaining a bed of solid particles within the drum; agitating phosphate rock or a mixture of phosphate rock and calcium metaphosphate with sufficient acidulating medium to form a slurry, said acidulating medium comprising nitric acid or a mixture of nitric acid with either sulfuric acid, phosphoric acid, or both sulfuric and phosphoric acid; distributing the slurry in the bed of rolling particles in proportion too small to change the solid state of the particles; introducing anhydrous ammonia or an ammonia containing solution beneath the bed of rolling solid particles in quantity sufficient to substantially neutralize the acid in the bed; maintaining the bed at a temperature conducive to granulation by the heat of reaction; controlling temperature and moisture content in the bed by controlling the proportion of dry, cool fines recycled; withdrawing at least partially granulated nitric phosphate fertilizer from the drum; drying, cooling, and sizing the withdrawn material; and recycling fines to the drum at controlled rate.

We have found that the disadvantages formerly characterizing the nitric phosphate processes are not present when operating in this manner. It is not necessary to use dilute nitric acid to form a slurry with the rock. We have used nitric acid of concentrations as high as 57 to 60 percent $HNO_3$, which results in a slurry containing about 22 percent water, without difficulty; and it is apparent that stronger acid, if available commercially, would be even more advantageous. By distributing the slurry in a bed of recycled dry fines—also containing potash salts, etc., if desired—we ammoniate solid particles. We have found that the resulting bed of solids, moistened with nitric acid slurry, has an avidity for ammonia so much less than that of a nitric acid-phosphate rock slurry that it is practically impossible for localized overammoniation to occur and to result in reversion of phosphate to an unavailable form. In fact, if the apparatus used to control the rate of ammonia supply is not properly adjusted and too much ammonia is fed, the excess merely passes through the bed without being absorbed; and the ammonia loss will direct the attention of the operator to improper adjustment.

The troublesome mud stage present in prior nitric phosphate processes is eliminated by forming a moist, granular mixture of acidulated slurry and recycled fines, and ammoniating this mixture with an ammoniating fluid. Plasticity sufficient for granulation develops, but the granules continue to roll freely without too much mutual adherence. Granulation temperature is maintained by the heat of reaction and is easily controlled by varying the proportion of cool fines recycled. Use of strong nitric acid eliminates much of the water necessarily present in slurries of prior processes, and a considerable part of the moisture present in our ammoniation step is evaporated during that step by the heat of reaction. Thus, the fuel requirements for drying are very low.

Figure 2:
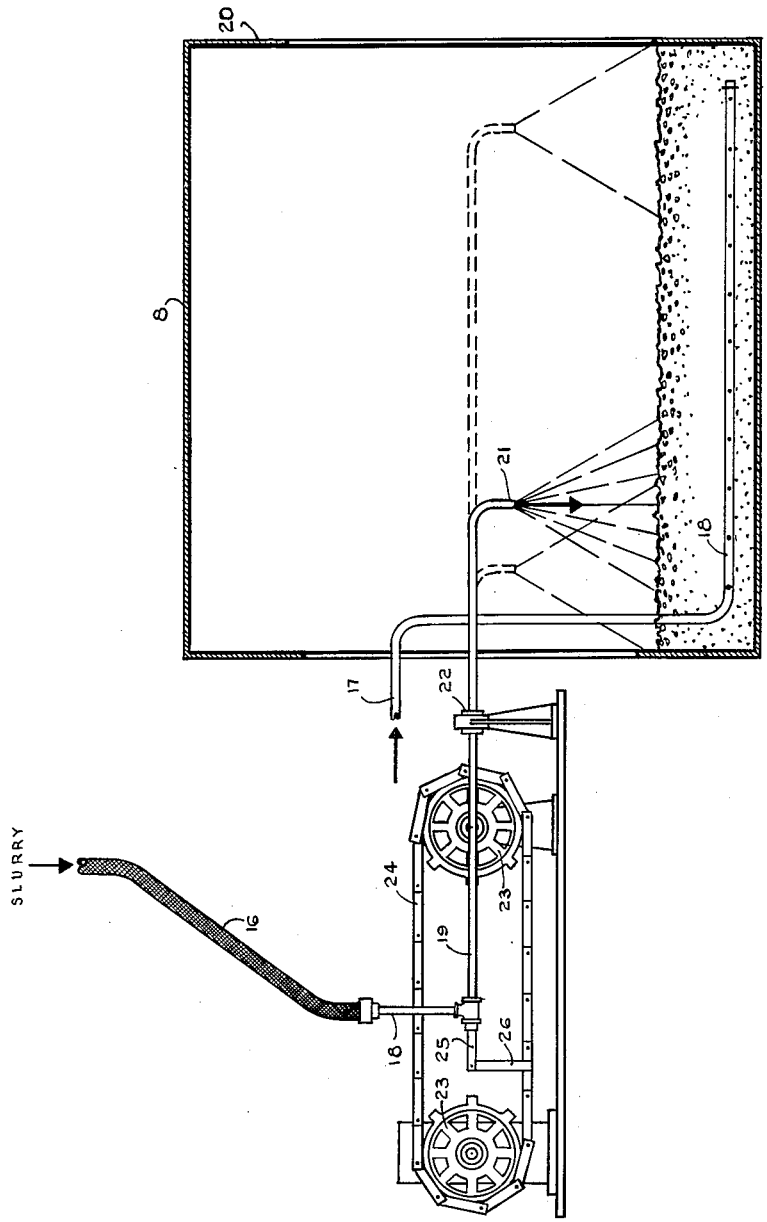

In the attached drawings, FIGURE 1 is a flowsheet diagrammatically illustrating a process conducted according to principles of our invention. FIGURE 2 is an enlarged representation of drum 8 of FIGURE 1, in vertical section, and of certain auxiliary equipment which we have found to be desirable.

In FIGURE 1 the reference numeral 5 indicates an automatic device for feeding fines from a later sizing step onto a suitable conveyor 6. Potash salts, trace elements, etc., if desired, are fed onto conveyor 6 by similar feeding device 9. A small amount of superphosphate, if required to balance the formulation, also may be introduced by feeding device 9. Conveyor 6 feeds solid materials at controlled rate via any suitable means for conveyance, illustrated as line 7, into a rotating drum 8. A bed of rolling solid particles is maintained in drum 8.

Two mixing vessels, 13 and 14, equipped with suitable agitators, are provided. A measured quantity of phosphate rock or of phosphate rock mixed with some calcium metaphosphate is introduced continuously into vessel 13 at the arrow 10. Strong nitric acid or a mixed acidulating medium is introduced at 12, and the mixture flows through line 15 to vessel 14 continuously. The capacity of the vessels 13 and 14 is such that sufficient retention time is provided in them at the desired feed rate to result in complete extraction of the phosphate content of the rock. The time required depends upon the fineness of the phosphate rock. If this material is ground to pass a 100-mesh screen, the time required is about 20 minutes; if ground only to pass a 20-mesh screen, the time required usually is about 30 minutes. We prefer to use phosphate rock of −20 mesh size. Rock of this size not only requires less grinding but also eliminates troubles due to foaming. While −100 mesh rock is operable, its use requires efficient equipment for breaking foam. When −20 mesh rock is used, there are practically no troubles due to foaming.

Calcium metaphosphate can be substituted for a part of the phosphate rock in this step. Substitution of this material for part of the rock may be desirable to balance the formulation. If it is desired to add some sulfuric acid or phosphoric acid to balance a formulation, it is added at 11 and is incorporated in the slurry. The temperature of the slurry rises to about 130° F. to 180° F. during extraction.

The completely extracted slurry is passed via line 16 to rotating drum 8 and is distributed in the bed of rolling particles maintained in the drum. The warm slurry is pumpable, and we have used pumps to transfer it via line 16; but it is very abrasive and extremely corrosive. At present we have not found a pump capable of handling such slurries without excessive wear. For this reason we prefer to accomplish this transfer of slurry by gravity flow. We have found gravity flow to be entirely satisfactory when no constrictions are present in the equipment used for distributing the slurry in the bed of rolling particles in drum 8.

One means for distributing slurry in the bed of rolling particles that we have found particularly advantageous is shown in FIGURE 2. Line 16 is made of corrosion-resistant, flexible hose. This hose is attached to a short metal pipe 18 of approximately the same internal diameter as line 16. Pipe 18 is suitably connected to a horizontal pipe 19 extending through a guide 22 into the interior of drum 8. The end 21 of pipe 19 is curved downward and is cut off without constriction. A pair of cogwheels 23, suitably supported and spaced from each other, is provided, and at least one of them is driven by a motor (not shown). An endless belt of links 24 is disposed upon cogwheels 23 in driving relationship. Belt 24 is connected to pipe 19 by suitable means comprising links 25 and 26. Travel of belt 24 thus causes reciprocating motion of end 21 of pipe 19 within drum 8. Drum 8 is provided with annular end members 20 which function to maintain a bed of rolling solid particles of predetermined depth in drum 8.

Slurry from vessel 14 is introduced in a spray from end 21 upon the surface of the bed of rolling particles. We prefer to reciprocate this spray at a rate of about 30 to 35 cycles per minute, although the rate is not particularly critical. The rate of flow of slurry is chosen so that the liquid-phase content of the bed does not exceed that required for good granulation. Anhydrous ammonia, or an ammonia-containing solution such as a solution of ammonia in aqueous ammonium nitrate or urea, is introduced from a source not shown via line 17 beneath the surface of the bed of rolling particles. Introduction of the ammonia may be accomplished by use of a perforated section 18 of line 17, or other types of distributing mechanism may be used. It is essential that the ammonia be introduced well below the surface of the bed, otherwise excessive loss of ammonia occurs.

The temperature of the bed rises to about 130° F. to 190° F. from the heat of reaction, depending on the formulation used. When nitric acid alone is used, this temperature is usually in the range from about 130° F. to 150° F.; but when sulfuric acid is used together with nitric acid, the temperature will be in the range from about 150° F. to 190° F. Temperature is controlled by controlling the quantity of relatively cool, dry fines recycled to obtain maximum granulation in drum 8.

Granulated material continuously overflows annular end member 20. Some formulations may require some additional rolling to obtain maximum granulation. When this is so, the overflowing material is passed by any suitable means for conveyance, illustrated as line 27 in FIGURE 1, to a second rotating drum 28 and is rolled to obtain maximum granulation. Drum 28 may be made integral with drum 8, if desired, but very few formulations require its use. When as is usually the case, complete granulation is obtained in drum 8, drum 28 may be omitted.

In either case, the fully granulated material is passed via line 29 to a dryer 31 and is dried by contact with a stream of warm air. Since strong nitric acid was used in forming the original slurry and a considerable quantity of moisture is evaporated by the heat of reaction in drum 8, and in drum 28 if used, the granulated material entering drum 31 has relatively little moisture content to be evaporated. In addition, all the material entering drum 31 is already at drying temperature. Hence, very little fuel is required to complete evaporation.

Dry material leaving dryer 31 is passed to suitable sizing apparatus, illustrated as a multiple screen 32, and is separated into oversize, fines, and product-size cuts. The product-size material is withdrawn to storage or use. Oversize is passed to crusher 33, is crushed, combined with fines, and recycled to automatic feeder 5.

The following examples give operating data and illustrate the use of our process with specific formulations.

*Example I*

In a pilot plant arranged substantially as shown in the drawings and equipped to produce about 1000 pounds of product per hour, materials were fed to the extraction vessels at the following rates: phosphate rock (35 percent $P_2O_5$), 265 pounds per hour; nitric acid (57 percent $HNO_3$), 565 pounds per hour; phosphoric acid (78 percent $H_3PO_4$), 94 pounds per hour.

Fine product from the sizing step was recycled to the ammoniating drum at a rate of 4300 pounds per hour, and potassium chloride at a rate of 233 pounds per hour was added to it to form a bed of rolling solids in the drum. The slurry from the extraction vessel was distributed across the top of this bed, and liquid anhydrous ammonia was introduced through a perforated distributor below the bed of solids at a rate of 91 pounds per hour. The slurry from the extraction vessel was at a temperature of 128° F., and the heat generated by the ammoniation reaction resulted in the product from the ammoniating drum attaining a temperature of 154° F. While the water content of the acids and the moisture content of the recycled product resulted in a moisture content of 6.6 percent in the combined solids fed to the ammoniator, the heat produced in the ammoniator was effective in reducing the moisture content of the ammoniated product leaving drum 8 to 4.9 percent.

The product from the ammoniator was passed through the granulator drum to the rotary drier in which it was heated by direct contact with a stream of hot gases. The product discharging from the drier at a temperature of 206° F. had a moisture content of about 1 percent. It was passed to a series of screens on which an oversize fraction retained on a 6-mesh screen and a fine fraction passing through a 10-mesh screen were separated from an intermediate product fraction. The oversize fraction was crushed in a roll crusher and combined with the fine fraction to make up the required recycle material for return to the ammoniating drum as described above. In this case about 40 percent of the total dry product from the drier or about 2240 pounds per hour was in the intermediate fraction, and 3360 pounds per hour was in the combined fines and crushed oversize fraction. Since, as indicated above, 4300 pounds of recycle per hour was required to maintain proper conditions in the ammoniating drum, some of the intermediate fraction also was crushed and used for recycling. The remaining intermediate fraction, at a rate of 1000 pounds per hour, constituted the product of the process. It had the following analysis, in percent by weight.

Total nitrogen _____ 14.1
Ammonia nitrogen _____ 7.4
Total $P_2O_5$ _____ 14.8
Available $P_2O_5$ _____ 14.3
Water-soluble $P_2O_5$ _____ 3.1
$K_2O$ _____ 14.2

The product was a free-flowing fertilizer of grade 14–14–14.

*Example II*

In the same pilot plant described in Example I, phosphate rock was fed to the extraction vessel at a rate of 201 pounds per hour. Nitric acid was added at a rate of 565 pounds per hour. The phosphate rock contained approximately 35 percent $P_2O_5$, and the nitric acid was of about 57 percent strength. These were agitated to form a fluid slurry. Recycled fines were fed to the ammoniator at a rate of 3900 pounds per hour. Concentrated superphosphate was mixed with this recycle at a rate of 165 pounds per hour. Solid potassium chloride also was added to the recycled fines at a rate of 233 pounds per hour. The resulting dry mixture was fed into the ammoniator to form a bed of rolling solid particles in the drum. Slurry from the extraction vessel was distributed across the full length of the top of this bed in a reciprocating spray, and gaseous ammonia was introduced through a perforated distributor below the bed of solids in the drum at a rate of 91 pounds per hour. Heat of reaction in the ammoniator raised the bed of rolling particles to good granulation temperature. Material emerging from the ammoniator drum was substantially all in granular form. Total moisture content of the ammoniator feed was 5 percent. The granular product emerging from the ammoniator had a moisture content of 3.4 percent. This product was passed directly to a dryer and sized and dried. The dry product had the following analysis, in percent by weight.

Total nitrogen _____ 14.2
Ammonia nitrogen _____ 7.2
Total $P_2O_5$ _____ 16.0
Available $P_2O_5$ _____ 15.1
Water-soluble $P_2O_5$ _____ 6.1
$K_2O$ _____ 14.1

This product was an excellent fertilizer, having a grade approximately 14–14–14.

*Example III*

In another run in the same pilot plant, phosphate rock having a $P_2O_5$ content of approximately 35 percent was fed to the extraction vessel at a rate of 201 pounds per hour. It was thoroughly agitated and extracted with strong nitric acid fed at a rate of 372 pounds per hour. Recycled fines were fed to the ammoniator at a rate of 2400 pounds per hour. With the recycle, concentrated superphosphate and potassium chloride were mixed at rates of 165 pounds per hour and 233 pounds per hour, respectively. This dry mixture formed a bed of rolling granules in the drum. An aqueous ammoniating solution containing 69 percent ammonium nitrate, 25 percent ammonia, and 6 percent water was introduced beneath the surface of the bed of rolling particles in the drum in quantity sufficient to substantially neutralize the nitric acid, namely at a rate of 220 pounds per hour. The product emerging from the ammoniator was substantially all granular. The total moisture content of the feed to the ammoniator, including both slurry and dry material, was 4.7 percent. Moisture content of the ammoniator product was 4.4 percent. The temperature of the slurry formed in the extraction step was 136° F. The temperature of the product emerging from the ammoniator was 156° F. The granular product was passed to a dryer, dried and sized. Analysis of the product material, in percent by weight, was as follows.

Total nitrogen _____ 14.4
Ammonia nitrogen _____ 7.3
Total $P_2O_5$ _____ 14.6
Available $P_2O_5$ _____ 13.8
Water-soluble $P_2O_5$ _____ 3.4
$K_2O$ _____ 13.9

The product was a fertilizer having excellent physical properties.

*Example IV*

In another run in the same pilot plant, phosphate rock of approximately 35 percent $P_2O_5$ content was fed to the extraction vessel at a rate of 354 pounds per hour. In the extraction vessel it was extracted with a mixture of nitric and sulfuric acids. Nitric acid of 57 percent strength was fed at a rate of 480 pounds per hour, and sulfuric acid containing 96 percent $H_2SO_4$ was fed to the extractor at a rate of 116 pounds per hour. The extracted slurry had a temperature of 174° F. Dry recycled fines were fed to the ammoniator at a rate of 3300 pounds per hour. Potassium chloride was mixed with this recycle at a rate of 200 pounds per hour. The resulting bed of solid rolling particles was ammoniated by introducing liquid ammonia beneath the surface of the bed at a rate of 77 pounds per hour. Temperature of the product overflowing from the ammoniator was about 155° F. Total moisture content of materials fed to the ammoniator was 6.4 percent. Moisture content of granulated product leaving the ammoniator was 5.4 percent. The granular product was passed to a dryer and sized. The dry product had the following analysis, in percent by weight.

Total nitrogen _____ 12.3
Ammonia nitrogen _____ 6.1
Total $P_2O_5$ _____ 12.4
Available $P_2O_5$ _____ 12.1
Water-soluble $P_2O_5$ _____ 0.6
$K_2O$ _____ 11.7

*Example V*

In another run in the same pilot plant, phosphate rock was fed to the extraction vessel at a rate of 209 pounds per hour. Calcium metaphosphate was fed to the same vessel at a rate of 120 pounds per hour. Both materials were of approximately 20-mesh size. They were mixed in the extraction vessel with nitric acid of 57 percent strength, fed at a rate of 565 pounds per hour. Recycled fines were fed to the ammoniator at a rate of 4100 pounds per hour. With the recycle, potassium chloride was mixed at a rate of 233 pounds per hour. The resulting bed of rolling solid particles in the ammoniator was ammoniated by anhydrous ammonia introduced beneath the surface of the bed at a rate of 91 pounds per hour. The granular product resulting was a fertilizer of excellent physical properties.

Many other runs were made. Fertilizers of 12-12-12, 10-15-20, and 10-20-15 grades were prepared. Our work showed that it would be feasible to prepare a 9-18-18 grade by this process, although an $N:P_2O_5:K_2O$ ratio of 1:1:1 is best from the economic standpoint. As the $N:P_2O_5$ ratio decreases, the economic advantage of our process decreases.

We claim as our invention:

1. A process for the production of granular nitric phosphate fertilizer which comprises extracting phosphate rock in particles at least fine enough to pass a standard 20-mesh screen, for about 20 to 30 minutes, with nitric acid having a concentration of about 57 percent to 60 percent $HNO_3$ in quantity sufficient to form a fluid slurry; introducing cool dry fines recycled from a later sizing step into a rotating drum; maintaining a bed of rolling solid particles comprising recycled fines in the drum; passing the slurry to the drum by gravity flow; distributing the slurry on the full length of the bed of rolling solid particles in a reciprocating spray in quantity sufficient to moisten the solid particles; introducing an ammoniating fluid beneath the bed of rolling solid particles in quantity sufficient to substantially neutralize the slurry; raising the temperature of the bed to about 130° F. to 150° F. by heat of reaction; controlling the temperature of the bed by controlling the proportion of fines recycled; withdrawing at least partially granulated nitric phosphate fertilizer from the drum; drying, cooling, and sizing the withdrawn material; and recycling fines to the rotating drum.

2. A process for the production of granular nitric phosphate fertilizer which comprises mixing sufficient nitric acid having a concentration above 57 percent $HNO_3$ with phosphate rock to form a fluid slurry; introducing cool dry fines recycled from a later sizing step into a rotating drum; maintaining a bed of rolling solid particles comprising recycled fines in the drum; distributing the slurry on the full length of the bed of rolling solid particles in a reciprocating spray in quantity sufficient to moisten the solid particles; introducing an ammoniating fluid beneath the bed of rolling solid particles in quantity sufficient to substantially neutralize the slurry; raising the temperature of the bed to about 130° F. to 150° F. by heat of reaction; controlling the temperature of the bed by controlling the proportion of fines recycled; withdrawing at least partially granulated nitric phosphate fertilizer from the drum; drying, cooling, and sizing the withdrawn material; and recycling fines to the rotating drum.

References Cited in the file of this patent

UNITED STATES PATENTS

| | | |
|---|---|---|
| 2,598,658 | Proctor et al. | May 27, 1952 |
| 2,783,140 | Hignett et al. | Feb. 26, 1957 |
| 2,837,418 | Seymour | June 3, 1958 |